Patented Apr. 24, 1945

2,374,433

UNITED STATES PATENT OFFICE 2,374,433

PRODUCTION OF BUTADIENE

Vladimir N. Ipatieff, Chicago, Ill., assignor to Universal Oil Products Company, Chicago, Ill., a corporation of Delaware No Drawing. Application June 8, 1942, Serial No. 446,267

4 Claims. (Cl. 260—681)

This invention relates to the conversion of ethyl alcohol into butadiene in the presence of a specific catalyst.

In one specific embodiment the present invention comprises a process for producing butadiene from ethyl alcohol, which comprises subjecting said alcohol to contact with a magnesium oxide catalyst at a temperature of from about 350° to about 550° C.

This invention relates to the production of butadiene from ethyl alcohol by treating the alcohol with magnesium oxide catalyst at a temperature from about 350° to about 550° C. and preferably within the approximate limits of 400° to 500° C. The preferred operating pressure is substantially atmospheric but may range from 0.1 to 5 atmospheres or more. The charge rate may be varied to produce the optimum results and, in general, will usually be within the range of 0.5 to 2 volumes of alcohol per hour per volume of catalyst, although lower or higher charge rates may be employed when desired.

In addition to the production of butadiene, other desirable products may be recovered in the present process. These desirable products include normally liquid compounds, such as acetaldehyde, aldol, etc., as well as normally gaseous products, such as propylene, butylenes and non-condensible gases, such as hydrogen, ethylene, etc.

It is also within the scope of the invention to admix acetaldehyde or ethylene with the ethyl alcohol prior to contact with the catalyst. The acetaldehyde and ethylene may be those recovered within the process and recycled thereto or those which are supplied from an extraneous source.

A preferred catalyst utilizable in the process of this invention is obtained by precipitating magnesium hydroxide or magnesium carbonate by the addition of a solution of a base or of a water-soluble carbonate to an aqueous solution of a magnesium salt followed by washing to remove water-soluble impurities from the precipitated material, then drying and heating the precipitate to drive off water or carbon dioxide and form substantially pure magnesium oxide.

Magnesium oxide, otherwise known as magnesia, obtained from either of the above indicated sources, may be employed in the form of a fixed bed through which the reaction mixture is passed or it may be utilized as powder in a substantially fluid type of operation or as a slurry in the charge to the process. The magnesia catalyst may be formed into particles by a number of methods such as pelleting into bodies of regular shape and size or pressing the powdered magnesia to form a cake which is crushed and screened to give granules of irregular shape and size. Material which has been made plastic by addition of a liquid as water may also be extruded and cut into pieces which are then dried to produce formed particles utilizable as reactor packing material.

The different forms of magnesia which may be employed as catalysts for the present process are not necessarily equivalent in their action and the operating conditions employed depend upon the activity of the catalyst utilized.

After the catalyst has lost its activity beyond a practical value, it may be regenerated by any suitable means and reused in the process. The usual method of regenerating this type of catalyst is by burning in the presence of air or oxygen-containing gas at a temperature within the range of 400° to 550° C., although lower temperatures may be used in certain instances. Usually it is not desirable for practical reasons to use temperatures above 550° C., although with certain specific catalysts it may be desirable to do so.

The following specific examples are introduced to show the results obtained in the operation of the process, although these data are not presented with the intention of unduly limiting the invention.

Example I 117 grams of ethyl alcohol were passed over 44 cc. of magnesium oxide catalyst at a temperature of about 475° C. atmospheric pressure, and a charge rate of about 2.04 volumes of alcohol per volume of catalyst, 65.1% of liquid product, expressed in weight per cent of ethyl alcohol which reacted, was obtained. This liquid product comprised acetaldehyde, hydrocarbons containing 5 and more carbon atoms per molecule, and the like. The condensible gases amounted to 24.1%, expressed in weight per cent of ethyl alcohol which reacted. This product included propylene, propane, butadiene, butylenes and butanes. The butadiene amounted to 40.5% by weight of the condensible gases. The non-condensible gases comprised 75.3 mol per cent of hydrogen and 11.7 mol per cent of olefins, the other products being primarily carbon dioxide, carbon monoxide and paraffins.

Example II

In an operation similar to Example I but utilizing a temperature of 500° C. and a charge rate of 1.01 volumes of alcohol per volume of catalyst, there are produced, expressed in weight per cent of ethyl alcohol which reacted, 66.5% of liquid product and 18.6% of condensible gases. The condensible gases contained 30.7% by weight of butadiene.

*Example III*

The catalyst used in this example was prepared in a slightly different manner from the catalysts utilized in Examples I and II but also was prepared within the broad teaching of the present invention. At atmospheric pressure, a temperature of 502° C. and a charge rate of 1.05 volumes of alcohol per volume of catalyst there was produced, expressed in weight per cent of ethyl alcohol which reacted, 51.7% of liquid product and 26.4% of condensible gases. The butadiene amounted to 25.1% by weight of the condensible gases.

I claim as my invention:

1. A process for producing butadiene which comprises subjecting ethyl alcohol under reaction conditions to contact with a catalyst consisting essentially of magnesium oxide prepared by precipitating a compound of magnesium decomposable into the oxide from a solution of a magnesium salt and heating and drying the precipitate to develop the catalytically active oxide.

2. A process for producing butadiene which comprises subjecting ethyl alcohol at a temperature above 350° C. and below 550° C. and under a pressure of from about 0.1 to about 5 atmospheres to contact with a catalyst consisting essentially of magnesium oxide prepared by precipitating a compound of magnesium decomposable into the oxide from a solution of a magnesium salt and heating and drying the precipitate to develop the catalytically active oxide.

3. A process for producing butadiene which comprises subjecting a mixture of ethyl alcohol and ethylene under reaction conditions to contact with a catalyst consisting essentially of magnesium oxide prepared by precipitating a compound of magnesium decomposable into the oxide from a solution of a magnesium salt and heating and drying the precipitate to develop the catalytically active oxide.

4. A process for producing butadiene which comprises subjecting a mixture of ethyl alcohol and acetaldehyde under reaction conditions to contact with a catalyst consisting essentially of magnesium oxide prepared by precipitating a compound of magnesium decomposable into the oxide from a solution of a magnesium salt and heating and drying the precipitate to develop the catalytically active oxide.

VLADIMIR N. IPATIEFF.